US012769793B2

(12) United States Patent
Mishra et al.

(10) Patent No.: US 12,769,793 B2
(45) Date of Patent: Oct. 20, 2026

(54) SYSTEM AND METHOD FOR INTELLIGENT PREDICTION AND IMPLEMENTATION OF DYNAMICALLY CHANGING REQUIREMENTS RELATING TO INCOMING NETWORK REQUESTS

(71) Applicant: BANK OF AMERICA CORPORATION, Charlotte, NC (US)

(72) Inventors: Amit Mishra, Egattur (IN); Anushka Pandey, Karapakkam (IN); Suvendu Ranjan Pani, Bhubaneshwar (IN); Krithika Viswanathan, Moulivakkam (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 866 days.

(21) Appl. No.: 18/120,179

(22) Filed: Mar. 10, 2023

(65) Prior Publication Data

US 2024/0303279 A1 Sep. 12, 2024

(51) Int. Cl.
*G06F 16/9032* (2019.01)
*G06F 21/31* (2013.01)
(Continued)

(52) U.S. Cl.
CPC ...... *G06F 16/90332* (2019.01); *G06F 21/606* (2013.01); *G06F 21/31* (2013.01);
(Continued)

(58) Field of Classification Search
CPC .. G06F 16/90332; G06F 21/606; G06F 21/32; G06F 21/31; G06F 40/226;
(Continued)

(56) References Cited

U.S. PATENT DOCUMENTS

| | | | |
|---|---|---|---|
| 8,554,534 | B2 | 10/2013 | Chawla et al. |
| 9,575,964 | B2 | 2/2017 | Kathol et al. |

(Continued)

OTHER PUBLICATIONS

Liu et al., NPL ("Blockchain and Machine Learning for Communications and Networking Systems" Published 2020 By IEEE, 40 pages (Year: 2020).*

*Primary Examiner* — Quoc A Tran
(74) *Attorney, Agent, or Firm* — Moore & Van Allen PLLC; Nicholas C. Russell

(57) ABSTRACT

Embodiments of the present invention provide a system for intelligent prediction and implementation of dynamically changing requirements relating to incoming network requests. The system is configured for determining that the entity system associated with an entity received a user request from a user, establishing a secure communication link with the entity system, extracting, via a requirement evaluator, through the secure communication link, at least a part of the user request that requires a requirement evaluation, predicting, via a requirement predictor, one or more requirements that are associated with the part of the user request, evaluating the one or more requirements and cataloged requirements stored in a requirement catalog, determining a real-time deviation between the one or more requirements and the cataloged requirements, and providing a solution for the real-time deviation.

20 Claims, 6 Drawing Sheets

(51) Int. Cl.

| | |
|---|---|
| ***G06F 21/32*** | (2013.01) |
| ***G06F 21/60*** | (2013.01) |
| ***G06F 40/226*** | (2020.01) |
| ***G06N 3/0442*** | (2023.01) |
| ***G06N 3/08*** | (2023.01) |
| ***G06N 3/09*** | (2023.01) |
| ***G06N 20/00*** | (2019.01) |
| ***H04L 9/32*** | (2006.01) |
| ***H04L 9/40*** | (2022.01) |

(52) U.S. Cl.
CPC ............ *G06F 21/32* (2013.01); *G06F 40/226* (2020.01); *G06N 3/0442* (2023.01); *G06N 3/08* (2013.01); *G06N 3/09* (2023.01); *G06N 20/00* (2019.01); *H04L 9/32* (2013.01); *H04L 63/0861* (2013.01); *H04L 2463/082* (2013.01)

(58) Field of Classification Search
CPC . H04L 9/32; H04L 63/0861; H04L 2463/082; G06N 20/00; G06N 3/08; G06N 3/09; G06N 3/0442
See application file for complete search history.

(56) References Cited

U.S. PATENT DOCUMENTS

| | | | | |
|---|---|---|---|---|
| 10,339,537 | B2 | 7/2019 | Kholkar et al. | |
| 10,698,934 | B1 | 6/2020 | Wohlsen et al. | |
| 11,388,021 | B2 | 7/2022 | Restrepo Conde et al. | |
| 11,561,804 | B1 | 1/2023 | Kushner et al. | |
| 11,748,575 | B2 | 9/2023 | Singh Bawa et al. | |
| 2016/0307258 | A1 | 10/2016 | May | |
| 2017/0372429 | A1 | 12/2017 | La Placa | |
| 2019/0012311 | A1 | 1/2019 | Singh et al. | |
| 2019/0025782 | A1* | 1/2019 | Mathews | G05B 15/02 |
| 2021/0398122 | A1 | 12/2021 | Matthews et al. | |
| 2022/0084511 | A1* | 3/2022 | Nickson | G10L 15/063 |
| 2022/0114474 | A1 | 4/2022 | Hofmann et al. | |
| 2022/0327291 | A1 | 10/2022 | Zeltyn et al. | |
| 2023/0013615 | A1 | 1/2023 | Sanghavi et al. | |
| 2023/0074261 | A1 | 3/2023 | Palamadai | |
| 2024/0283782 | A1* | 8/2024 | Killoran, Jr. | G06Q 20/3825 |

* cited by examiner

SYSTEM AND METHOD FOR INTELLIGENT PREDICTION AND IMPLEMENTATION OF DYNAMICALLY CHANGING REQUIREMENTS RELATING TO INCOMING NETWORK REQUESTS

BACKGROUND

There exists a need for a system that intelligently predicts and implements dynamically changing requirements relating to incoming network requests.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for intelligent prediction and implementation of dynamically changing requirements relating to incoming network requests. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that the entity system associated with an entity received a user request from a user, establishes a secure communication link with the entity system, extracts, via a requirement evaluator, through the secure communication link, at least a part of the user request that requires a requirement evaluation, predicts, via a requirement predictor, one or more requirements that are associated with the part of the user request, evaluates the one or more requirements and cataloged requirements stored in a requirement catalog, determines a real-time deviation between the one or more requirements and the cataloged requirements, and provides a solution for the real-time deviation.

In some embodiments, the present invention provides the solution for the real-time deviation based on historical data stored in a historical database.

In some embodiments, the present invention predicts the one or more requirements, via the requirement predictor, based on rule-based mapping.

In some embodiments, the present invention predicts the one or more requirements, via the requirement predictor, wherein the requirement predictor comprises a machine learning model.

In some embodiments, the present invention extracts the cataloged requirements stored in the requirement catalog.

In some embodiments, the entity system is a virtual assistant system.

In some embodiments, the user request is a conversation between the user and the virtual assistant system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
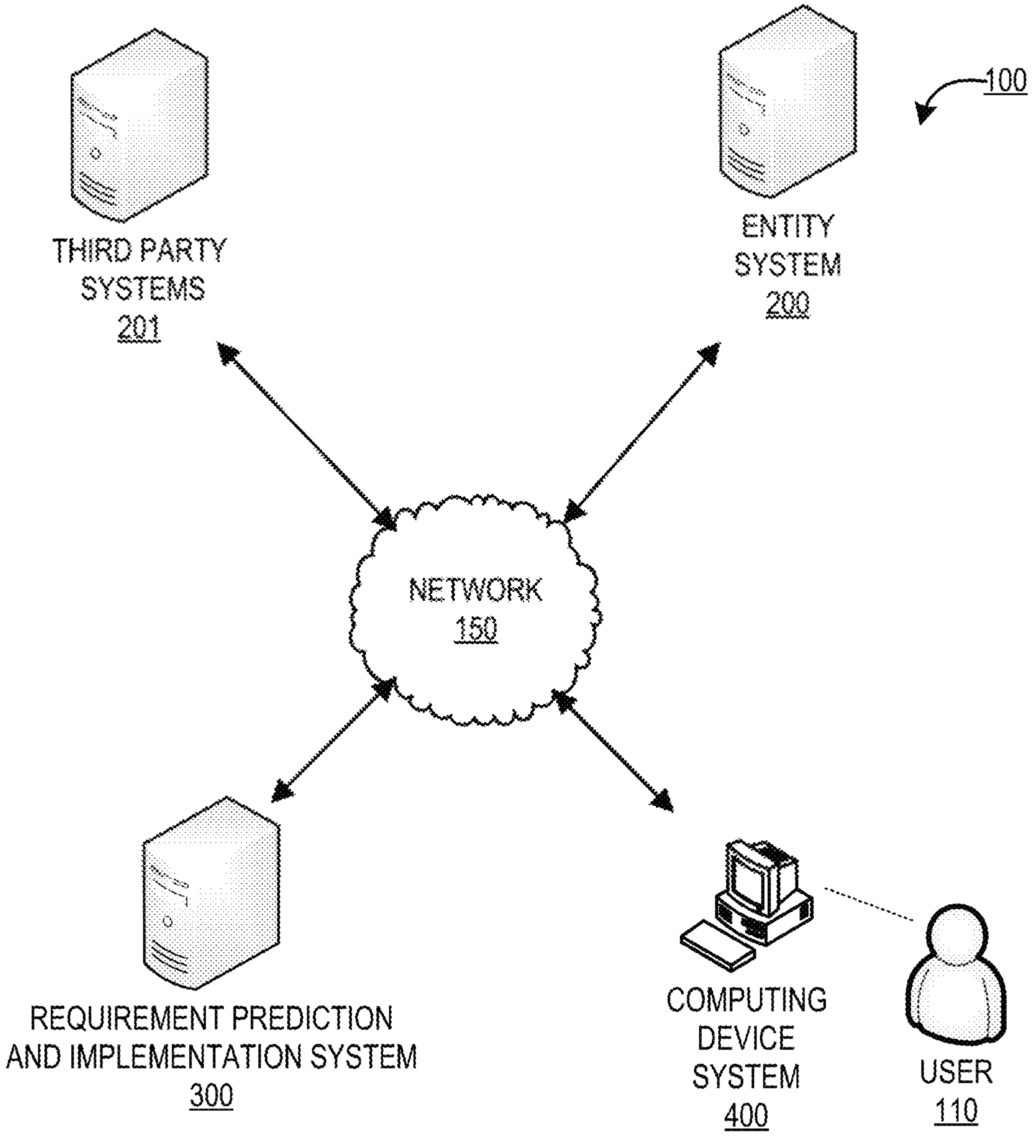
Figure 2:
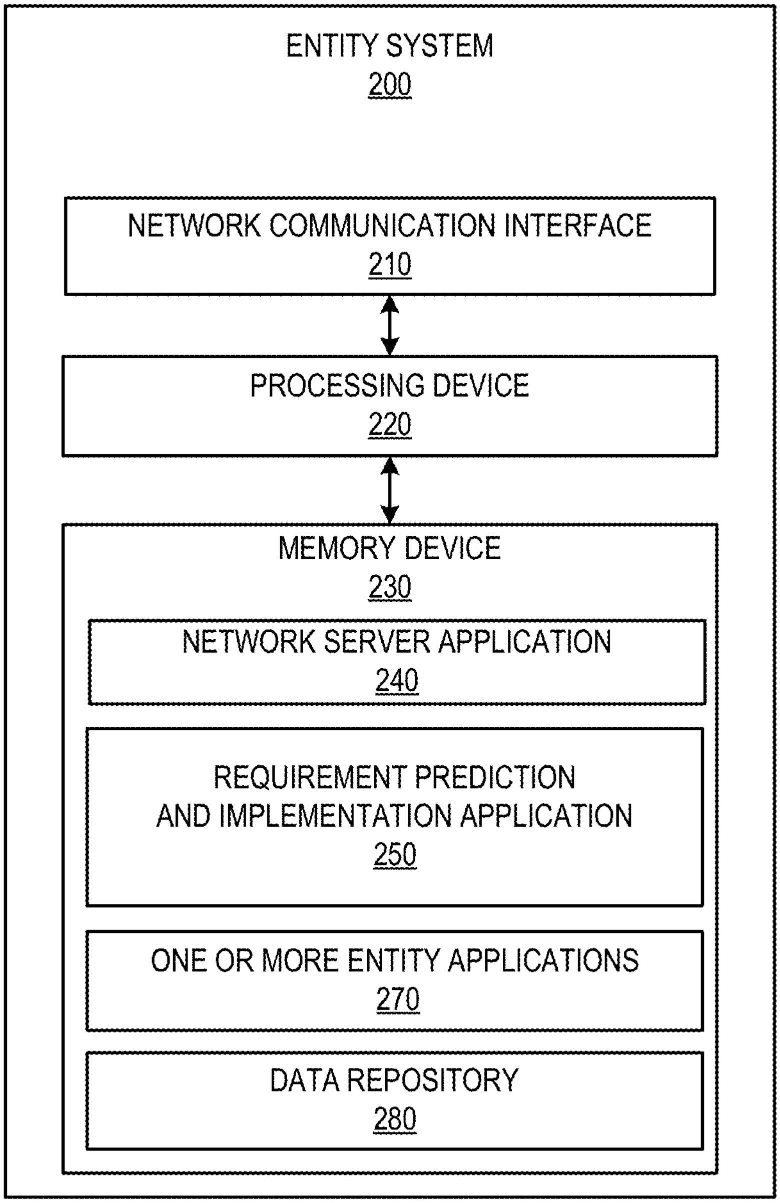
Figure 3:
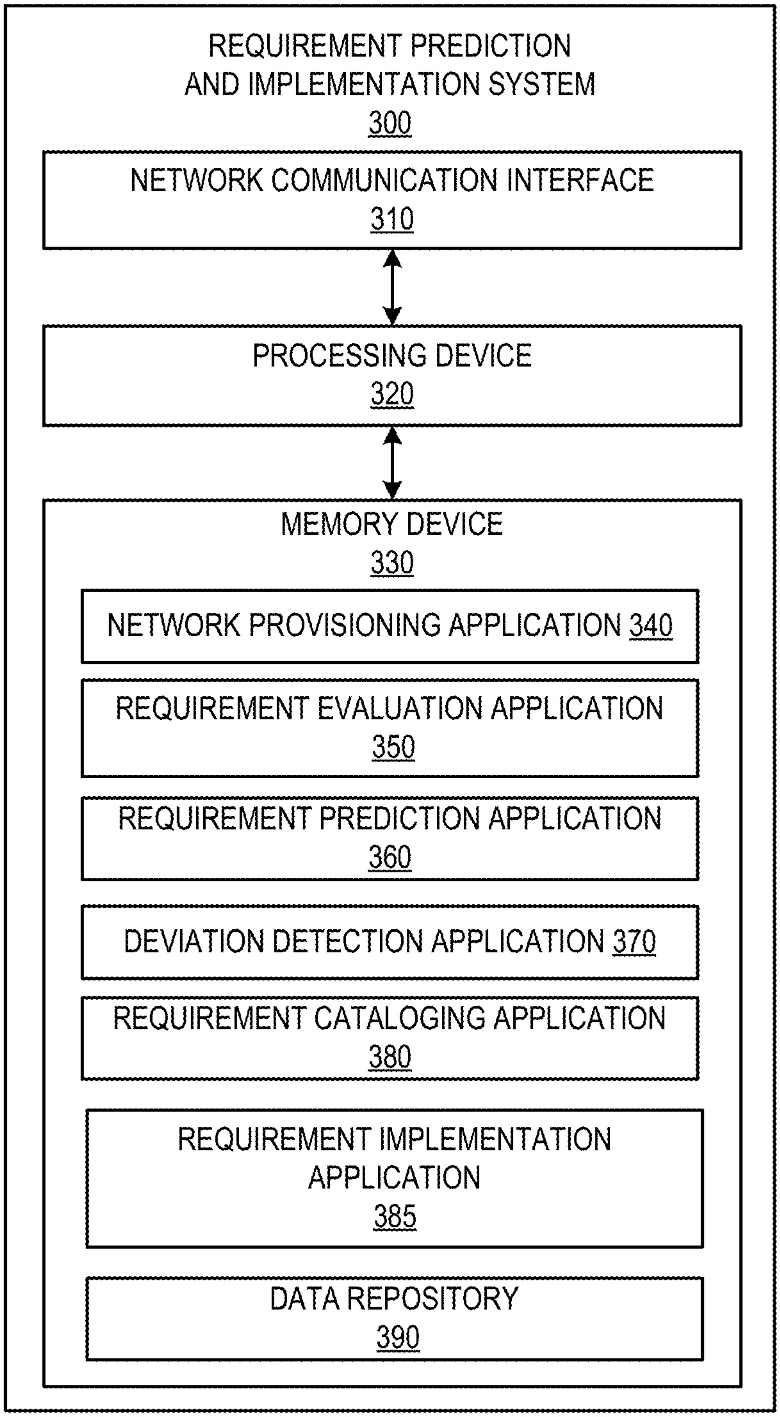
Figure 4:
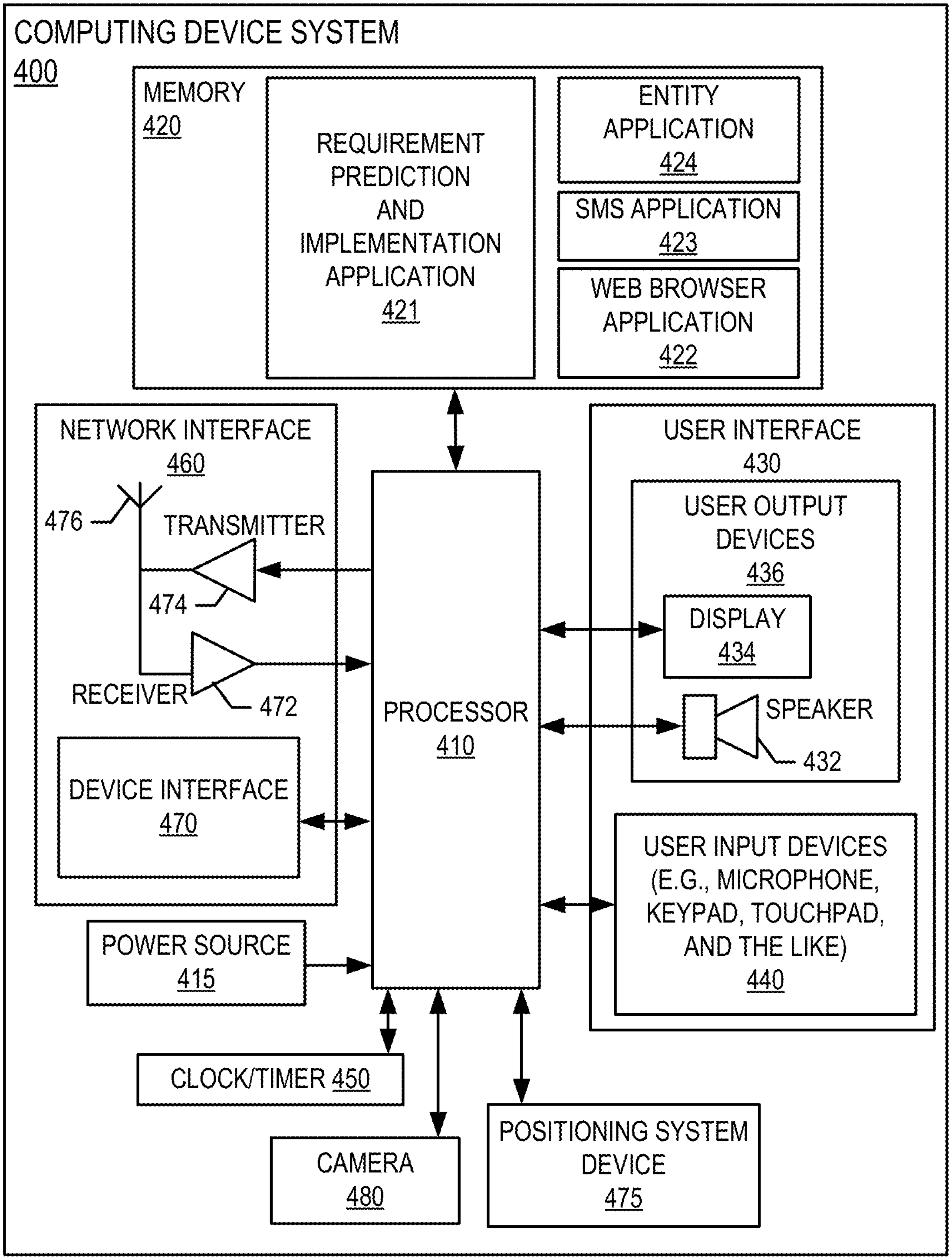
Figure 5:
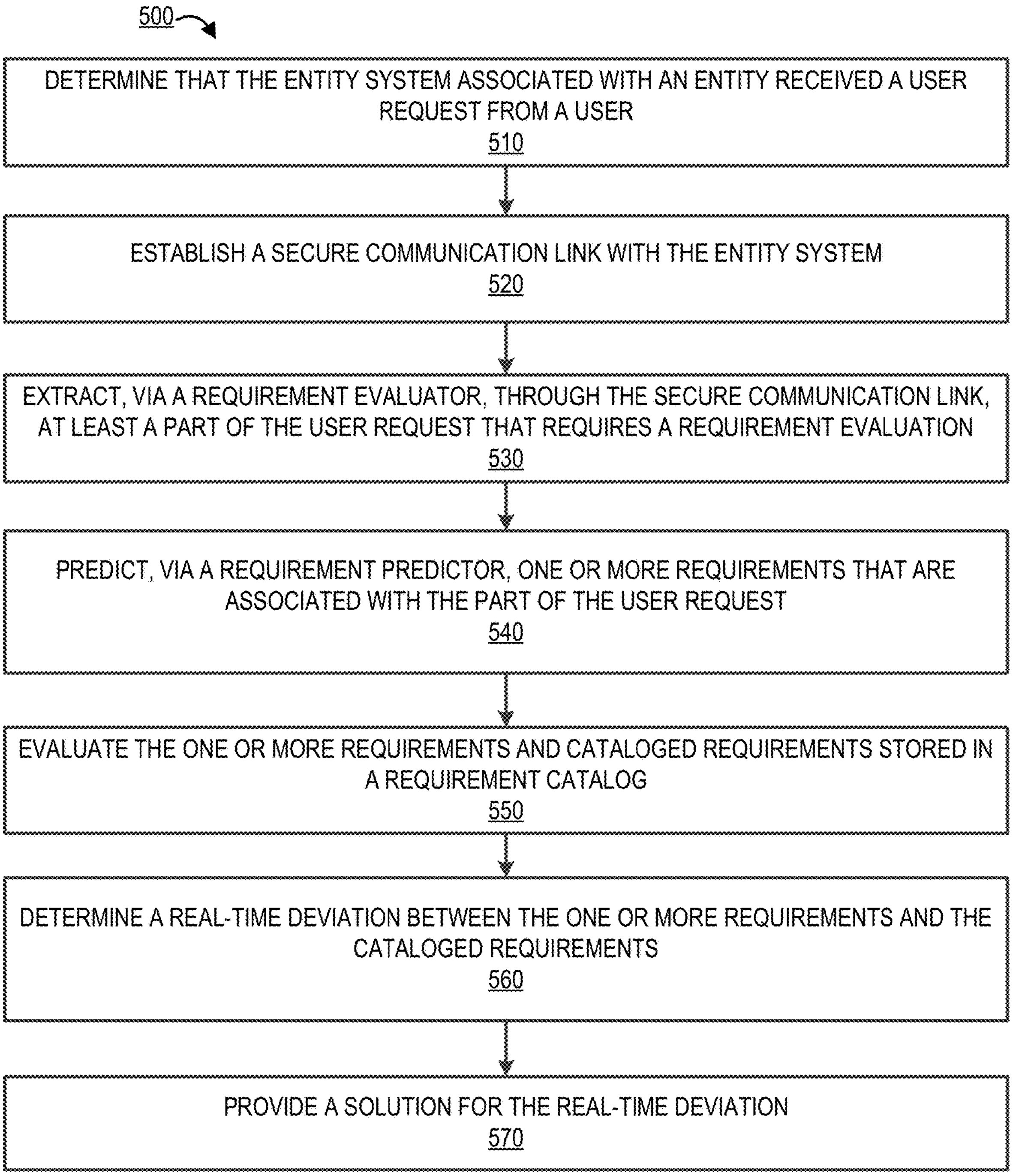
Figure 6:
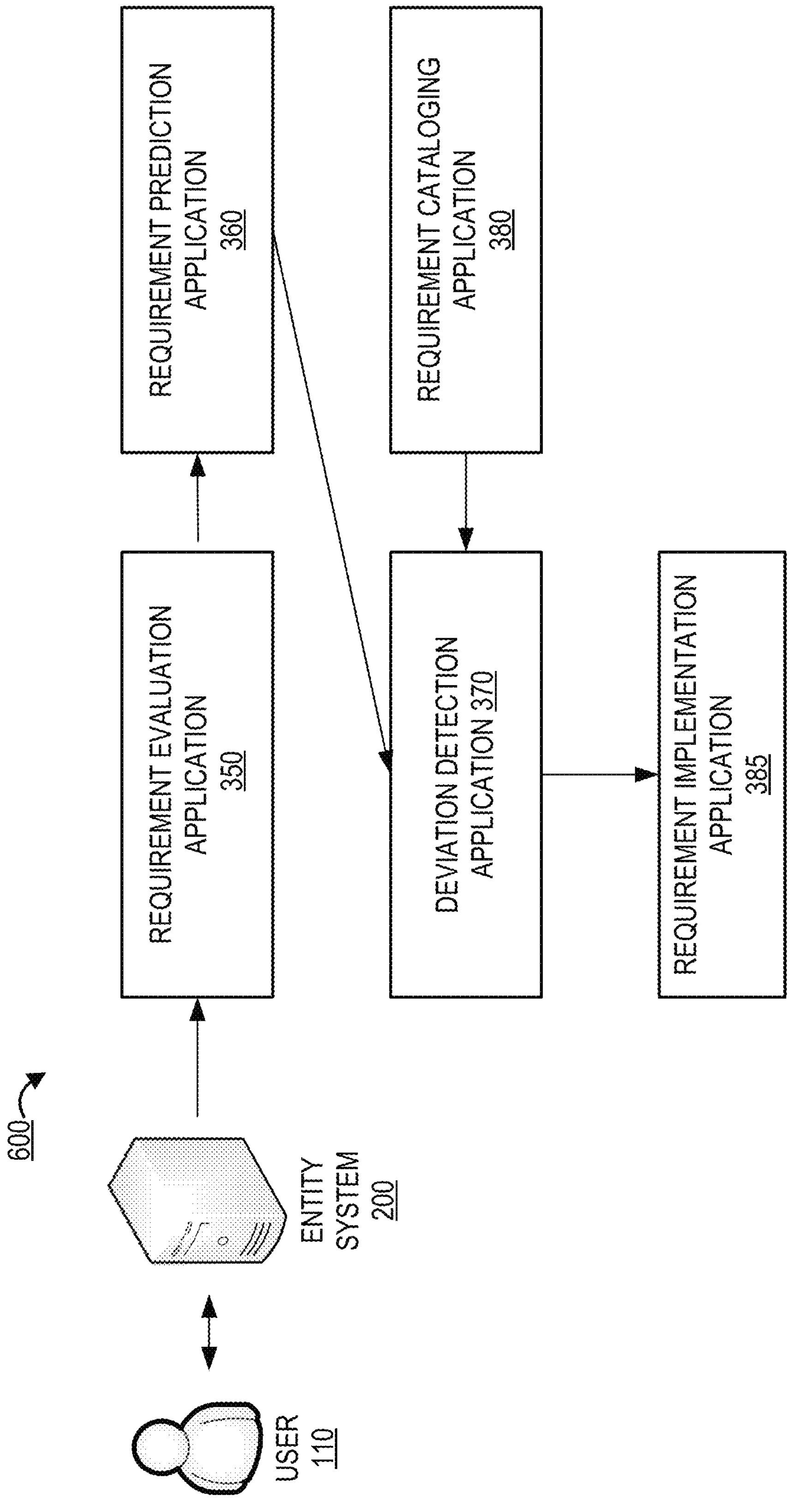

Having thus described embodiments of the invention in general terms, reference will now be made the accompanying drawings, wherein:

FIG. 1 provides a block diagram illustrating a system environment for intelligent prediction and implementation of dynamically changing requirements relating to incoming network requests, in accordance with an embodiment of the invention;

FIG. 2 provides a block diagram illustrating the entity system 200 of FIG. 1, in accordance with an embodiment of the invention;

FIG. 3 provides a block diagram illustrating a requirement prediction and implementation system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for intelligent prediction and implementation of dynamically changing requirements relating to incoming network requests, in accordance with an embodiment of the invention; and FIG. 6 provides a block diagram for intelligent prediction and implementation of dynamically changing requirements relating to incoming network requests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which develops, maintains, utilizes, and/or manages, one or more entity resources (e.g., applications, frameworks, databases, and/or the like) to perform one or more organizational activities (e.g., user requests). In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution. As used here, the term "third party entity" may refer to any third party organization that provides dynamically changing requirements (e.g., policies). In some embodiments, a "user" may be an employee of the entity. In some embodiments, a "user" may be a customer of the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, entities are subjected to various requirements for performing one or more organizational activities. These requirements are dynamic in nature and are often modified by regulating entities that monitor whether the requirements are properly enforced by entities or not. For example, where the entity is a financial institution, the requirements that are required to be enforced by the financial institution may include Payment Card Industry Data Security Standard (PCIDSS), Financial Industry Regulatory Authority (FINRA) rule, and/or the like. Each transaction that is processed by the financial institution has to adhere to the requirements associated with the financial institution and the transaction. As such, there exists a need for a system that monitors one or more activities associated with the entity, predicts requirements that are associated with the one or more activities, and implements the requirements while processing the one or more activities associated with the entity. The system of the present invention provides a solution to this problem as discussed in detail below.

FIG. 1 provides a block diagram illustrating a system environment 100 for intelligent prediction and implementation of dynamically changing requirements relating to incoming network requests, in accordance with an embodiment of the invention. As illustrated in FIG. 1, the environment 100 includes a requirement prediction and implementation system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some embodiments, the one or more user(s) 110 of the system environment 100 may be customers or potential customers of the entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that manages, utilizes, maintains, and/or develops one or more entity resources (e.g., applications, frameworks, databases, or the like) to perform one or more organizational activities (e.g., user requests). In some embodiments, the one or more third party systems 201 may be any organization that provides dynamically changing requirements (e.g., policies) associated with organizational activities of the entity. In one exemplary embodiment, where the entity is a financial institution, the one or more third party entities associated with the one or more third party systems 201 provide all policies associated with processing financial transactions.

The requirement prediction and implementation system 300 is a system of the present invention for performing one or more process steps described herein. In some embodiments, the requirement prediction and implementation system 300 may be an independent system. In some embodiments, the requirement prediction and implementation system 300 may be a part of the entity system 200.

The requirement prediction and implementation system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the requirement prediction and implementation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the requirement prediction and implementation system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution. In some embodiments, the entity system 200 is operated by an entity that is a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a requirement prediction and implementation application 250, one or more entity applications 270, and a data repository 280. The one or more entity applications 270 may be any applications developed, supported, maintained, utilized, and/or controlled by the entity that perform one or more organizational activities. The computer-executable program code of the network server application 240, the requirement prediction and implementation application 250, the one or more entity application 270 to perform certain logic, data-extraction, and data-storing functions of the entity system 200 described herein, as well as communication functions of the entity system 200.

The network server application 240, the requirement prediction and implementation application 250, and the one or more entity applications 270 are configured to store data in the data repository 280 or to use the data stored in the data repository 280 when communicating through the network communication interface 210 with the requirement prediction and implementation system 300, and/or the computing device system 400 to perform one or more process steps described herein. In some embodiments, the entity system 200 may receive instructions from the requirement prediction and implementation system 300 via the requirement prediction and implementation application 250 to perform certain operations. The requirement prediction and implementation application 250 may be provided by the requirement prediction and implementation system 300.

FIG. 3 provides a block diagram illustrating the requirement prediction and implementation system 300 in greater detail, in accordance with embodiments of the invention. As illustrated in FIG. 3, in one embodiment of the invention, the requirement prediction and implementation system 300 includes one or more processing devices 320 operatively coupled to a network communication interface 310 and a memory device 330. In certain embodiments, the requirement prediction and implementation system 300 is operated by an entity, such as a financial institution. In certain embodiments, the requirement prediction and implementation system 300 is operated by an entity, such as a non-financial institution. In some embodiments, the requirement prediction and implementation system 300 is owned or operated by the entity of the entity system 200. In some embodiments, the requirement prediction and implementation system 300 may be an independent system. In alternate embodiments, the requirement prediction and implementation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the requirement prediction and implementation system 300 described herein. For example, in one embodiment of the requirement prediction and implementation system 300, the memory device 330 includes, but is not limited to, a network provisioning application 340, a requirement evaluation application 350, a requirement prediction application 360, a deviation detection application 370, a requirement cataloging application 380, a requirement implementation application 385, and a data repository 390 comprising any data processed or accessed by one or more applications in the memory device 330. The computer-executable program code of the network provisioning application 340, the requirement evaluation application 350, the requirement prediction application 360, the deviation detection application 370, the requirement cataloging application 380, and the requirement implementation application 385 may instruct the processing device 320 to perform certain logic, data-processing, and data-storing functions of the requirement prediction and implementation system 300 described herein, as well as communication functions of the requirement prediction and implementation system 300.

The network provisioning application 340, the requirement evaluation application 350, the requirement prediction application 360, the deviation detection application 370, the requirement cataloging application 380, and the requirement implementation application 385 are configured to invoke or use the data in the data repository 390 when communicating through the network communication interface 310 with the entity system 200, and/or the computing device system 400. In some embodiments, the network provisioning application 340, the requirement evaluation application 350, the requirement prediction application 360, the deviation detection application 370, the requirement cataloging application 380, and the requirement implementation application 385 may store the data extracted or received from the entity system 200, and the computing device system 400 in the data repository 390. In some embodiments, the network provisioning application 340, the requirement evaluation application 350, the requirement prediction application 360, the deviation detection application 370, the requirement cataloging application 380, and the requirement implementation application 385 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a requirement prediction and implementation application 421, and an entity application 424. These applications also typically instructions to a graphical user interface (GUI) on the display 430 that allows the user 110 to interact with the entity system 200, the requirement prediction and implementation system 300, and/or other devices or systems. The memory 420 of the computing device system 400 may comprise a Short Message Service (SMS) application 423 configured to send, receive, and store data, information, communications, alerts, and the like via the wireless network 152. In some embodiments, the entity application 424 may be an online banking application. In some embodiments, the requirement prediction and implementation application 421 provided by the requirement prediction and implementation system 300 allows the user 110 to access the requirement prediction and implementation system 300. In some embodiments, the entity application 424 provided by the entity system 200 and the requirement prediction and implementation application 421 allow the user 110 to access the functionalities provided by the requirement prediction and implementation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for intelligent prediction and implementation of dynamically changing requirements relating to incoming network requests, in accordance with an embodiment of the invention. As shown in block 510, the system determines that the entity system associated with an entity received a user request from a user. In some embodiments, the system may tap into the one or more entity systems to monitor any incoming requests from users of the entity. In some embodiments, the system may receive an indication from the entity system upon receiving the user request from the user. The entity system may be any system associated with an entity. In some embodiments, the entity system may be a virtual assistant system that interact with users (e.g., customers/employees) of the entity. For example, where the entity is a financial institution, a customer of the entity may initiate an interaction with the virtual assistant to perform a financial transaction. In another example, where the entity is a non-financial institution which develops one or more entity applications, an employee may initiate an interaction with a virtual assistant system to deploy a software code into a real-time environment. In some embodiments, the user request may be a conversation between the user and the virtual assistant system. In some embodiments, the system of the invention may be integrated into any devices associated with the entity for monitoring and implementing requirements associated with one or more organizational activities associated with the entity. In some embodiments, the system may be an independent system that is in network communication with the entity systems of the entity to monitor and implement requirements associated with the one or more organizational activities associated with the entity.

As shown in block 520, the system establishes a secure communication link with the entity system. As shown in block 530, the system extracts, via a requirement evaluator, through the secure communication link, at least a part of the user request that requires a requirement evaluation. In an embodiment, where the user request is a conversation between the user and the entity system, the system extracts only parts of the conversation that require evaluation of requirements instead of processing the entire conversation. For example, where the entity is a financial institution and the user request may be a conversation between the user and virtual assistant system to process a financial transaction, where the conversation may include other statements that may not be related to processing of the financial transaction. In such instances, the system may extract only the part of the conversation that is associated with the financial transaction and processing of the financial transaction. In some embodiments, the system may extract only the part of the user request that is relevant based on determining intent of the request. Continuing with the previous example, the system may determine that the intent of the conversation is to perform the financial transaction and may extract only statements that are associated with the financial transaction and may ignore other statements that are part of the conversation, where the statements may comprise details associated with processing of the financial transaction.

As shown in block 540, the system predicts, via a requirement predictor, one or more requirements that are associated with the part of the user request. The requirement predictor may process the part of the user requested extracted by the system in block 530 and may predict the one or more requirements that may are applicable to the user request. In some embodiments, the requirement predictor of the system may employ a rule-based mapping approach to determine the one or more requirements, where the requirement predictor comprises a rule based engine. In such embodiments, the rule-based engine may comprise one or more rules that are coded into the rule-based engine based on type of entity system, type of application, type of user request, and/or the like. In some embodiments, the requirement predictor of the system may comprise a machine learning model and/or artificial intelligence engine to predict the one or requirements associated with the user request. In such embodiments, the artificial intelligence component of the requirement predictor may predict the one or more requirements based on type of entity system, type of application accepting the user request, type of user request, and/or the like. In some embodiments, in the initial phases of implementation of the system, the requirement predictor may be combination of a rule-based engine and a machine learning model, where the machine learning model learns the process of prediction of requirements based on the decisions taken by the rule-based engine and after a certain amount of time, the rule-based engine may be replaced by the machine learning model.

As shown in block 550, the system evaluates the one or more requirements and cataloged requirements stored in a requirement catalog. The system may extract the cataloged requirements from a requirement catalog that may be associated with the user request, where the requirement catalog comprises a list of all requirements associated with the entity. In some embodiments, the requirement catalog may also comprise rules associated with each requirement. The system may maintain the requirement catalog and keep the requirement catalog up to date by constantly checking for any updates to the requirements based on communicating with third party entities. Based on evaluating, the system may determine whether the user request complies or does not comply with at least one of the one or more requirements or the cataloged requirements. Continuing with the previous example, the system may determine whether the user request complies or does not comply with requirements such as Payment Card Industry Data Security Standard (PCIDSS) requirement, where the PCIDSS requirement may be associated with a list of rules which may include installing and maintaining a firewall configuration to protect cardholder data, not using factory passwords and other security parameters, protecting stored card holder data, encrypting transmission of cardholder data across public networks, and/or the like. The system communicate with various other entity systems or entity applications while evaluating the one or more requirements and cataloged requirements.

As shown in block 560, the system determines a real-time deviation between the one or more requirements and the cataloged requirements. The system may evaluate the one or more requirements and the cataloged requirements to determine that a list of rules associated with the one or more requirements and the cataloged requirements are enforced. In a case where any rule of the list of rules is not enforced, the system may determine that anomaly as the real-time deviation.

As shown in block 570, the system provides a solution for the real-time deviation. The system may provide the solution based on historical data. Continuing with the previous example, the system may determine that the user requirement does not comply with Payment Card Industry Data Security Standard (PCIDSS) requirement based on determining that the rule of installing and maintaining a firewall configuration to protect cardholder data is not met, the system may provide and automatically implement a solution that comprises installation of the firewall configuration.

FIG. 6 provides a block diagram for intelligent prediction and implementation of dynamically changing requirements relating to incoming network requests, in accordance with an embodiment of the invention. As shown, the user 110 may initiate a conversation with the entity system 200. Upon determinization of initiation of the conversation, the requirement evaluation application 350 evaluates the conversation and extracts parts of the conversation that are associated with a user request that is to be processed by the entity system 200. The requirement prediction application 360 then predicts one or more requirements (e.g., policies) that are applicable to the user request based on processing the parts of conversation extracted by the requirement evaluation application 350. The requirement cataloging application 380 catalogs all requirements and rules associated with each of the requirements associated with the entity and all types of requests/actions handled by the entity. Based on the type of the user request, the requirement cataloging application 380 may provide a list of up-to-date results (e.g., requirements and related rules) to the deviation detection application 370. The deviation detection application 370 then evaluates the one or more requirements predicted by the requirement prediction application 360 and the results provided by the requirement cataloging application to detect any deviations. Upon detecting deviation(s), the requirement implementation application 385 may provide solution(s) to auto-heal the deviations to enforce the one or more requirements associated with processing the user request.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligent prediction and implementation of dynamically changing requirements relating to incoming network requests, the system comprising:

at least one network communication interface;

at least one non-transitory storage device; and at least one processing device coupled to the at least one non-transitory storage device and the at least one network communication interface, wherein the at least one processing device is configured to:

determine that an entity system associated with an entity received a user request from a user;

establish a secure communication link with the entity system;

extract, via a requirement evaluator, through the secure communication link, at least a part of the user request that requires a requirement evaluation;

predict, via a requirement predictor, one or more requirements that are associated with the part of the user request;

access a requirement catalog comprising cataloged requirements associated with the entity and extract the cataloged requirements stored in the requirement catalog;

evaluate the one or more requirements and the cataloged requirements extracted from the requirement catalog;

determine a real-time deviation between the one or more requirements and the cataloged requirements; and provide a solution for the real-time deviation.

2. The system of claim 1, wherein the at least one processing device is configured to provide the solution for the real-time deviation based on historical data stored in a historical database.

3. The system of claim 1, wherein the at least one processing device is configured to predict the one or more requirements, via the requirement predictor, based on rule-based mapping.

4. The system of claim 1, wherein the at least one processing device is configured to predict the one or more requirements, via the requirement predictor, wherein the requirement predictor comprises a machine learning model.

5. The system of claim 1, wherein the at least one processing device is further configured to extract the cataloged requirements stored in the requirement catalog.

6. The system of claim 1, wherein the entity system is a virtual assistant system.

7. The system of claim 6, wherein the user request is a conversation between the user and the virtual assistant system.

8. A computer program product for intelligent prediction and implementation of dynamically changing requirements relating to incoming network requests, the computer program product comprising a non-transitory computer-readable storage medium having computer executable instructions for causing a computer processor to perform the steps of:

determining that an entity system associated with an entity received a user request from a user;

establishing a secure communication link with the entity system;

extracting, via a requirement evaluator, through the secure communication link, at least a part of the user request that requires a requirement evaluation;

predicting, via a requirement predictor, one or more requirements that are associated with the part of the user request;

accessing a requirement catalog comprising cataloged requirements associated with the entity and extracting the cataloged requirements stored in the requirement catalog;

evaluating the one or more requirements and the cataloged requirements extracted from the requirement catalog;

determining a real-time deviation between the one or more requirements and the cataloged requirements; and providing a solution for the real-time deviation.

9. The computer program product of claim 8, wherein the computer executable instructions cause the computer processor to perform the step of providing the solution for the real-time deviation based on historical data stored in a historical database.

10. The computer program product of claim 8, wherein the computer executable instructions cause the computer processor to perform the step of predicting the one or more requirements, via the requirement predictor, based on rule-based mapping.

11. The computer program product of claim 8, wherein the computer executable instructions cause the computer processor to perform the step of predicting the one or more requirements, via the requirement predictor, wherein the requirement predictor comprises a machine learning model.

12. The computer program product of claim 8, wherein the computer executable instructions cause the computer processor to perform the step of extracting the cataloged requirements stored in the requirement catalog.

13. The computer program product of claim 8, wherein the entity system is a virtual assistant system.

14. The computer program product of claim 13, wherein the user request is a conversation between the user and the virtual assistant system.

15. A computer implemented method for intelligent prediction and implementation of dynamically changing requirements relating to incoming network requests, wherein the method comprises:

determining that an entity system associated with an entity received a user request from a user;

establishing a secure communication link with the entity system;

extracting, via a requirement evaluator, through the secure communication link, at least a part of the user request that requires a requirement evaluation;

predicting, via a requirement predictor, one or more requirements that are associated with the part of the user request;

accessing a requirement catalog comprising cataloged requirements associated with the entity and extracting the cataloged requirements stored in the requirement catalog;

evaluating the one or more requirements and the cataloged requirements extracted from the requirement catalog;

determining a real-time deviation between the one or more requirements and the cataloged requirements; and providing a solution for the real-time deviation.

16. The computer implemented method of claim 15, wherein the method comprises providing the solution for the real-time deviation based on historical data stored in a historical database.

17. The computer implemented method of claim 15, wherein the method comprises predicting the one or more requirements, via the requirement predictor, based on rule-based mapping.

18. The computer implemented method of claim 15, wherein the method comprises predicting the one or more requirements, via the requirement predictor, wherein the requirement predictor comprises a machine learning model.

19. The computer implemented method of claim 15, wherein the entity system is a virtual assistant system.

20. The computer implemented method of claim 19, wherein the user request is a conversation between the user and the virtual assistant system.

* * * * *